Sept. 10, 1935.  E. HANO  2,014,020
COUNTER SALES BOOK
Filed Aug. 13, 1934  5 Sheets-Sheet 1

INVENTOR,
Edward Hano,
BY
Harry W. Bowen.
ATTORNEY.

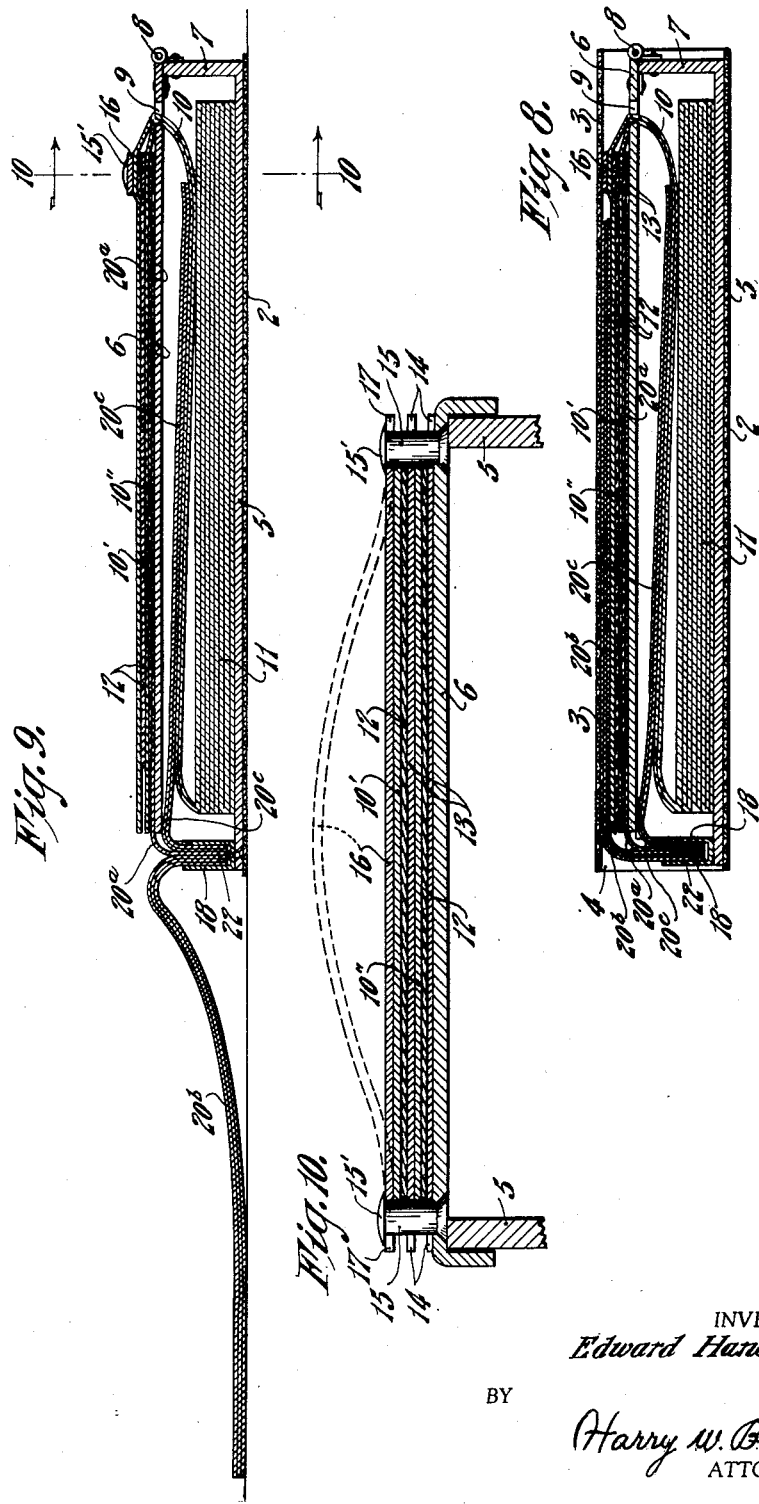

Sept. 10, 1935.  E. HANO  2,014,020
COUNTER SALES BOOK
Filed Aug. 13, 1934  5 Sheets-Sheet 3

INVENTOR,
Edward Hano,
BY
Harry W. Bowen
ATTORNEY.

Sept. 10, 1935. E. HANO 2,014,020
COUNTER SALES BOOK
Filed Aug. 13, 1934 5 Sheets-Sheet 4
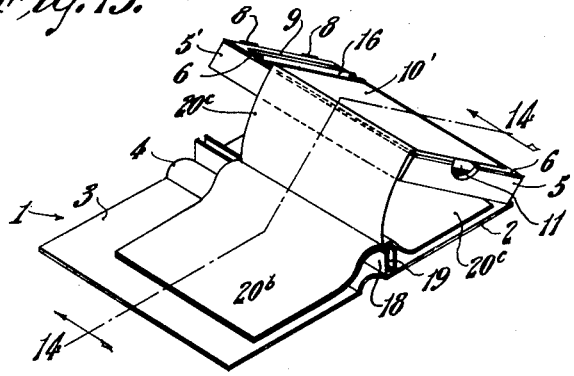
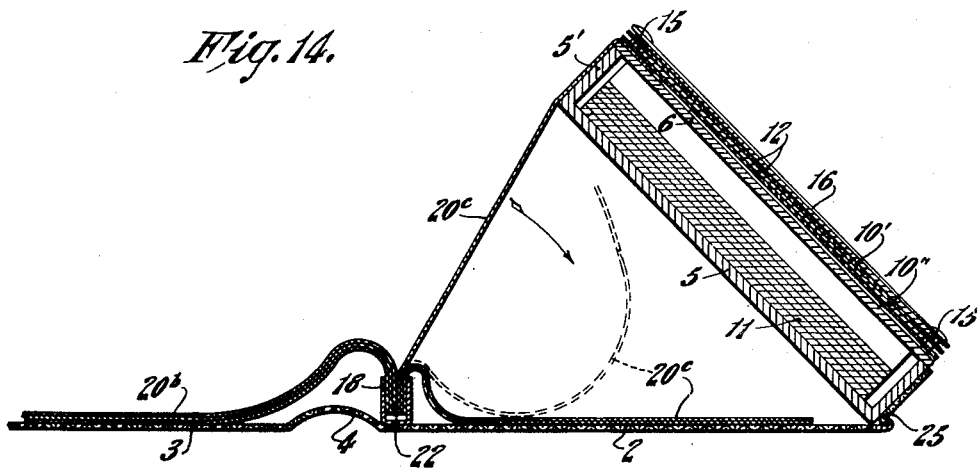
INVENTOR,
Edward Hano,
BY
Harry W. Bowen,
ATTORNEY.

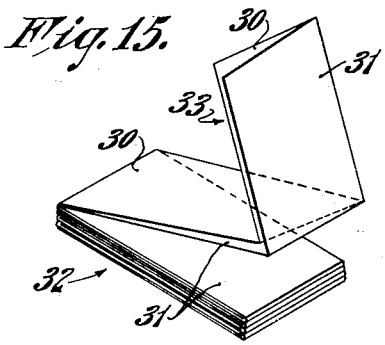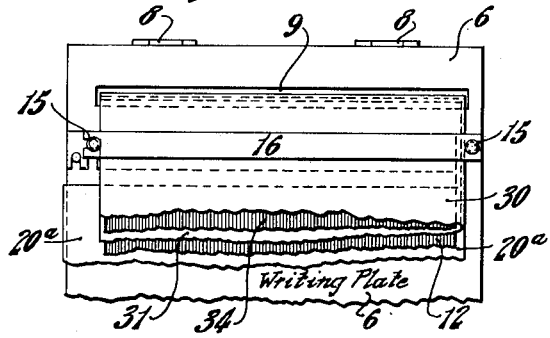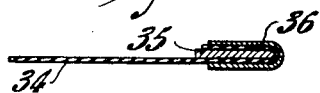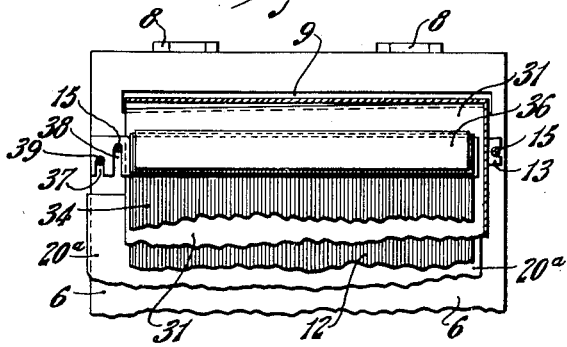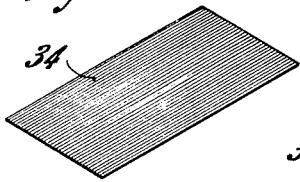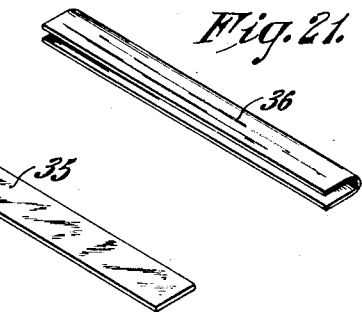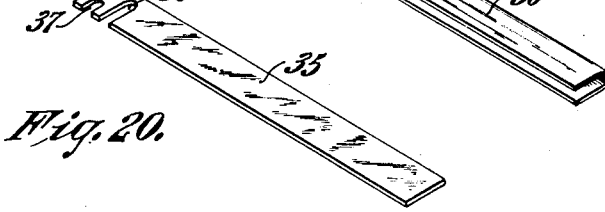

Patented Sept. 10, 1935

2,014,020

UNITED STATES PATENT OFFICE 2,014,020

COUNTER SALES BOOK

Edward Hano, Holyoke, Mass.

Application August 13, 1934, Serial No. 739,619

8 Claims. (Cl. 282—3)

My invention relates to improvements in counter sales books.

An object of my invention is to provide a counter sales book in which an original sheet and one or more copies, made up in sets and attached in continuous fold pack or zig-zag form, may be used, pulled through, and torn off, and then replaced by a second set, ready for use.

A further object of my invention is to provide a counter sales book in which continuous fold pack, or zig-zag manifolding forms may be used in co-operation with a single set of transfer sheets. Existing practice in the trade is to use a bound book of printed forms in co-operation with loose transfer sheets, which must be removed each time a slip is made out, and replaced between the sheets of the next set of forms. It is my purpose to eliminate this waste of time and labor by providing means for using a single set of transfer sheets, secured in place in such a manner that they will remain in place during the use of a complete set or pack of manifolding forms, to be renewed only when the book is loaded with a new pack or book of forms.

A third object of my invention is to provide a counter sales book in which a bound book of record sheets may be used in co-operation with sets of manifolding forms, so that a record will be made on a sheet of the bound book of sheets at the same time that the original and copy sheets of the manifolding forms are used.

A still further object of my invention is to provide a counter sales book, in which manifolding forms and a bound record book may be used, in co-operation with each other, which is simple and sturdy in construction, economical of manufacture, very compact and light of weight, easy to reload, and the use of which will result in a saving of time and effort over existing methods and practice.

These, and other objects and advantages of my invention will be more completely disclosed and described in the specification, the accompanying drawings, and the appended claims.

Broadly, my invention comprises a cover or binder, a receptacle for the storage of a set of manifolding forms secured on the binder, a writing plate hinged on the receptacle, means for removably securing a bound record book on the binder or receptacle adjacent an end or side of the receptacle, means for guiding a set of manifolding forms from the receptacle onto the writing plate; one or more transfer sheets being secured on the writing plate in such a manner as to remain undisturbed when the manifolding sheets are drawn from the writing plate; the arrangement and co-operation of these elements or members being such that a sheet of the bound record book may be located on the writing plate with the transfer sheets and the sheets of the manifolding set, so that an entry made on the original sheet of the manifolding set will be copied on the copy sheets of the manifolding set and also on the sheet of the bound record book; means for removing a used sheet of the bound record book from the writing plate, and means for separating the used and unused sheets of the bound record book, when the counter sales book is closed.

A preferred embodiment of my invention is illustrated in the accompanying drawings, in which:—

Fig. 8 is a sectional view on the line 8—8 of Fig. 1.

Fig. 9 is a sectional view on the line 9—9 of Fig. 2.

Fig. 10 is a cross, sectional view on the line 10—10 of Fig. 9.

Fig. 13 is a perspective view of a modified form of counter sales book, and

Fig. 14 is a sectional view on the line 14—14 of Fig. 13.

Figure 1:
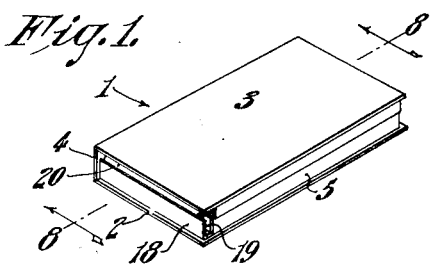
Fig. 1 is a perspective view of my counter sales book, when closed.

A modified form of counter sales book, for use in cooperation with fan-fold form sheets, is illustrated in Figs. 15 to 21, inclusive, in which:—

Fig. 15 is a perspective view of a pack, or book, of fan-fold form sheets.

Fig. 16 is a partial, plan view of the writing plate with form sheets in place, ready for use.

Fig. 17 is a partial, plan view, partially in section, similar to Fig. 16, illustrating the method of holding the transfer sheets.

Fig. 18 is a partial, sectional view, illustrating the holder for the transfer sheets used with the fan-fold form sheets.

Fig. 19 is a perspective view of a transfer sheet used with the fan-fold form sheets.

Fig. 20 is a perspective view of the bar for the transfer sheets, and

Fig. 21 is a perspective view of the clip used in co-operation with the bar illustrated in Fig. 20, to hold the transfer sheets.

Referring now to the drawings in detail, in which like numerals refer to like parts throughout:—

A binder member 1, comprising a back cover part 2, a front cover part 3, and a flexible band portion 4 joining the parts 2 and 3, has secured on the part 2 a boxlike receptacle 5. A writing plate 6, preferably of metal having a smooth upper surface, is pivotally secured on an upper end 7 of the receptacle 5 by hinges 8. The writing plate 6 is formed with a transverse slot 9, adjacent the hinges 8, through which sets 10 of a pack or book 11 of manifolding forms may be drawn onto the writing plate 6. Transfer sheets 12, each provided with a reinforcing strip 13, of heavy paper or other suitable material, which extends beyond the transfer sheet 12 on either side and are formed with slots 14, are secured on the writing plate 6 by engagement of the slots 14 on the studs 15, secured on the writing plate 6, adjacent the slot 9. The transfer sheets 12 are arranged in alternate relation on the writing plate 6 with an original sheet 10' and one or more copy sheets 10" of the set 10, with a transfer sheet 12 beneath the last copy sheet 10". The original sheet 10' and copy sheet, or sheets 10" and the transfer sheets 12 are held in place on the writing plate 6 by a spring clip 16, formed with end slots 17, which engage the studs 15 under stud heads 15'. The spring clip 16 may be removed from the studs 15 by lifting it into the position shown dotted in Fig. 10, which will disengage the slots 17 from the studs 15. The studs 15 are spaced on the writing plate 6 to act as guides for the side edges of the manifold set 10, as indicated in Fig. 10.

A U-shaped spring clip member 18, having an open end 19, is secured to and extends transversely across the bottom of the receptacle 5, thus forming a lower closure end for the receptacle 5, opposite the upper end 7.

Figure 5:
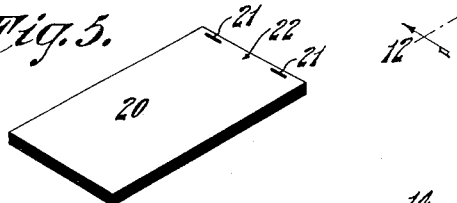
Fig. 5 is a perspective view of a typical bound book of thin record sheets used in co-operation with the counter sales book.
Figures 6, 7:
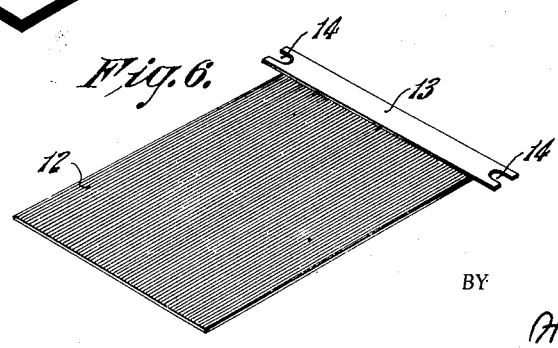
Fig. 6 is a perspective view of a transfer sheet.
Fig. 7 is a perspective view of the spring clip used to retain the various sheets and transfer sheets in position on the writing plate.

A book or pack 20, (see Fig. 5), of record sheets are permanently bound together with staples or metal stitches 21; are removably secured on the receptacle 5 by slipping the bound edge 22 into the open end 19 of the spring clip member 18. Whereas, I have indicated staples or metal stitches as binding units for the book or pack 20, it will be readily understood that any of the various means for securing or binding sheets of paper together are equally adaptable for use with my counter sales book.

The counter sales book is loaded, or arranged for use, by placing a set or pack 11 of manifolding forms in the receptacle 5 beneath the hinged metal writing plate 6. A bound book 20, of record sheets, is inserted in the spring clip member 18 by sliding it transversely of the base. A sheet 20ª, of the book 20, is laid on the writing plate 6; a transfer sheet 12 is then laid face down on the sheet 20ª and secured on the studs 15; then a set 10 of the manifolding form sheets is drawn from the receptacle 5 through the slot 9 and the lowermost copy 10" is laid on the transfer sheet 12. A second transfer sheet 12 is then laid face down on the sheet 10". This process is continued until the original sheet 10' is laid on the last transfer sheet 12, when the whole is secured in place by setting the spring clip 16 on the studs 15. The remaining sheets of the record book 20 are laid on the sheet 10', and the cover part 3 of the binder 1 is folded over the whole to close the counter sales book, as indicated in Figs. 1 and 8. This arrangement results in a very compact, light weight, counter sales book, simple in operation and easy to handle and use.

Whereas, I have described the arrangement as used with a record book 20 of opaque or translucent sheets, it will be readily understood by those skilled in the art, that if transparent sheets are used in the record book 20, one of the transfer sheets 12 may be omitted by first placing a transfer sheet 12 face up on the writing plate 6, then, the record sheet 20ª, then, the lowermost manifold copy sheet 10", and from there, continue as before.

Figure 2:
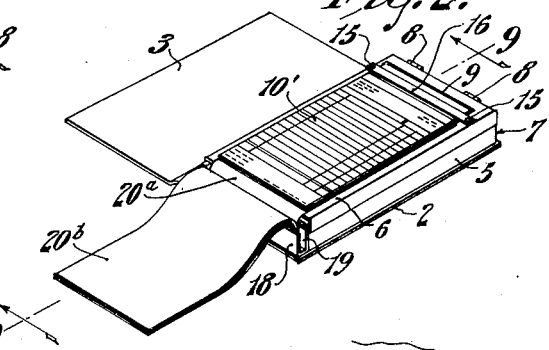
Fig. 2 is a perspective view of the counter sales book open, ready for use.
Figure 3:
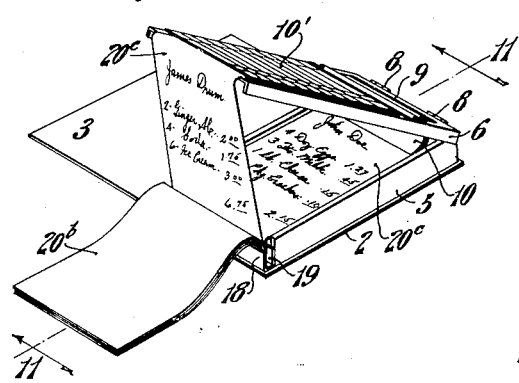
Fig. 3 is a perspective view of the counter sales book with the writing plate raised and a sheet of the bound record book being drawn from the writing plate.
Figure 11:
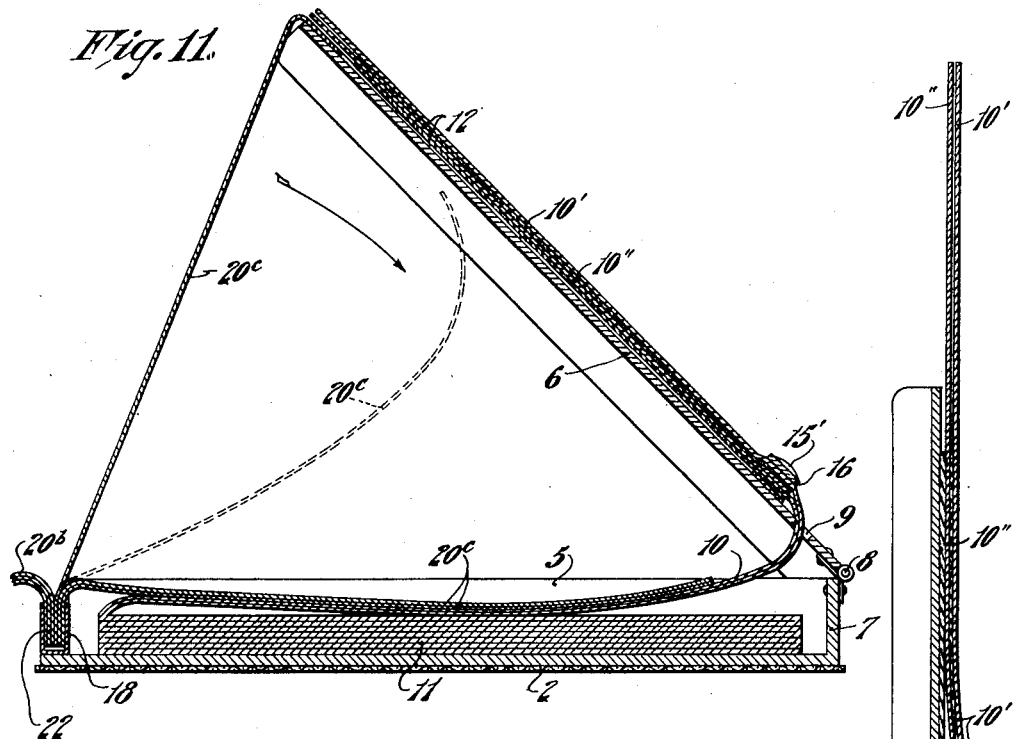
Fig. 11 is a sectional view on the line 11—11 of Fig. 3.

In operation, the cover part 3 and the unused sheets 20ᵇ, of the record book 20, are laid back as indicated in Figs. 2 and 9. After an entry has been made on the original sheet 10', the hinged writing plate 6 is raised into the position shown in Figs. 4 and 12. This operation draws the used record sheet 20ᶜ from the writing plate, as indicated in Figs. 3 and 11, and when the sheet 20ᶜ is free from the writing plate 6, it falls into the receptacle 5 on top of the manifold pack 11. Thus, the used sheets 20ᶜ, of the record book 20, are stored in the receptacle 5 beneath the writing plate 6 and on top of the manifold pack 11. In the position of the writing plate 6, indicated in Figs. 4 and 12, the used manifold set 10 may be drawn from the writing plate 6; at the same time, pulling the next adjacent set 10 into position for use. The used manifold set is then torn off, at the usual line of weakness, and the writing plate 6 returned to position on the receptacle 5. The new set of manifolding forms and the transfer sheets are then lifted and the next unused sheet 20ª, of the record book 20, inserted beneath the lowermost transfer sheet.

Figure 4:
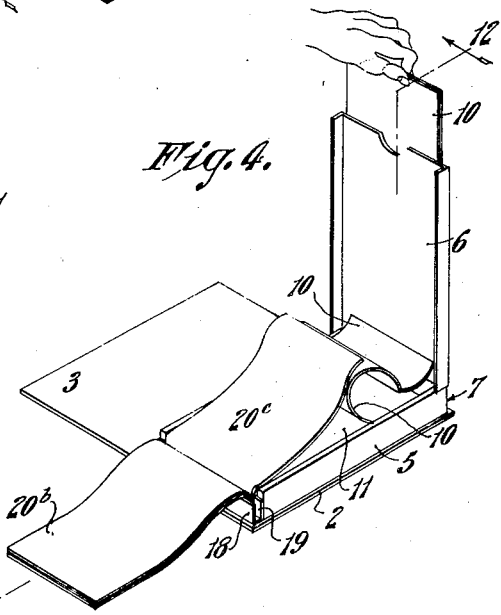
Fig. 4 is a view similar to Fig. 3 with the writing plate completely raised and showing a set of manifolding forms being drawn from the writing plate.
Figure 12:
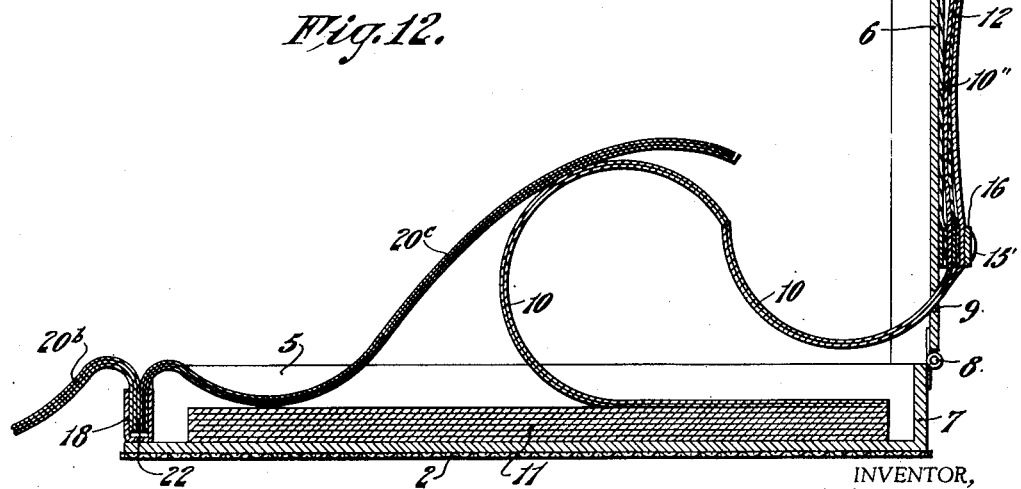
Fig. 12 is a sectional view on the line 12—12 of Fig. 4.

A modified form of counter sales book is illustrated in Figs. 13 and 14. In this form, the U-shaped spring clip 18 is secured on the binder member 2, adjacent a side edge 5' of the receptacle 5, and the receptacle 5 is pivotally secured at 25 to the binder part 2. In this construction, the used sheets 20ᶜ, of the record book 20, are stored beneath the receptacle 5 on the binder part 2, thus segregating them from the manifold pack 11. A used sheet 20ᶜ is removed from the writing plate 6 and automatically falls, or is dropped onto the binder part 2, by raising the receptacle 5, as indicated in Figs. 13 and 14. In this construction, it is not necessary to raise the writing plate 6 from the receptacle 5 to remove the sheet 20ᶜ, nor is it necessary to raise the writing plate 6 as far as indicated in Figs. 4 and 12, to remove a set of manifolding forms. Also, a better view is permitted of the manifold pack 11 and movement of a set of forms therefrom, as the used sheet 20ᶜ, of the record book 20, do not lie on top of the manifold pack.

It will be readily understood, by those skilled in the art, that the above construction, illustrated in Figs. 13 and 14, may be applied to the counter sales books, illustrated in Figs. 1-12 inclusive, simply by hingedly securing the receptacle 5 to the binder part 2, at its upper end, below the hinges 8 of the writing plate 6.

Fig. 15 illustrates a typical pack of fan-fold form sheets, as used in the trade. A continuous strip of paper is printed with any desired arrangement and folded longitudinally to form a series of original sheets 30 and a second series of copy sheets 31. The folded continuous sheet is then perforated with lines of weakness and folded transversely in zig-zag form to make a deck or pack 32, as indicated in Fig. 15. The pack 32 is used in the counter sales book, in a similar manner to that shown and described for the standard fold pack forms 11. A set 33 is drawn from the receptacle 5 through the slot 9, onto the writing plate 6 and between the pins or studs 15, on top of a transfer sheet 12 and a sheet 20a, of the record book 20, as indicated in Figs. 16 and 17. A transfer sheet 34 has an end thereof wrapped around a bar 35 and held thereon by a clip member 36, as shown in Fig. 18. The bar 35 is formed at one end with slots 37 and 38, which are engaged by studs 15 and 39 on the writing plate 6, to hold the transfer sheets 34 in place between the original sheet 30 and the copy sheet 31 of the fan-fold form 33. The transfer sheet 34 is slightly more narrow, transversely, than the sheets 30 and 31, to permit free movement of the sets 33 across the writing plate 6, while the transfer sheet remains stationary. The spring clip 16 is used to hold the various sheets in place on the writing plate, being engaged by the studs 15, in a similar manner to that shown for the fold pack or zig-zag forms, illustrated in Figs. 1–14 inclusive.

What I claim is:—

1. In combination, in a counter sales book, a cover member, a boxlike receptacle hinged to said cover member for receiving a pack of manifolding forms, a writing plate hinged on said receptacle and formed with a slot adjacent the hinged end through which sets of manifold sheets are drawn from the receptacle onto the writing plate, and means secured on said cover member for removably securing a bound book on said cover member.

2. In combination, in a counter sales book, a receptacle for receiving a pack of manifold forms and provided with end members, a writing plate hinged to one of said end members, a spring clip forming the opposite one of said end members for holding a bound book of record sheets, said writing plate being formed with an opening adjacent its hinged end through which a set of manifold forms are drawn from the receptacle onto the writing plate, studs on said writing plate adjacent said slot for guiding the side edges of said manifold forms and on which a plurality of transfer sheets may be removably secured, whereby a sheet of the record book and the sheets of the manifold set may be arranged on the writing plate in alternate relation with the transfer sheets for making manifold copies and a record sheet copy of an entry made on the original sheet of the manifold set.

3. In a counter sales book, a binder member, a receptacle for manifold forms pivotally secured on said binder member, a writing plate on said receptacle, means for removably securing a bound book of record sheets on said binder member, whereby, when a sheet of the bound record book is laid on said writing plate, movement of said receptacle about its pivotal support on the cover member will remove said used sheet from said writing plate, and will permit it to fall onto the cover member and below the receptacle.

4. In combination, in a counter sales book, a binder member, a manifold form-receiving receptacle movably secured to the binder member, an apertured writing plate pivotally secured to the said receiving receptacle, for permitting sheets of the manifold to be drawn from the receptacle onto the writing plate, means for removably securing transfer sheets on the writing plate, means for removably securing a bound book of record sheets to the binder member, the construction and arrangement being such that when the said receptacle is raised from its normal position, a sheet of the bound book will automatically be removed from the writing plate and dropped under the receptacle onto the cover plate, and whereby the used and unused sheets of the bound book may be segregated from each other, as described.

5. In a counter sales book, a binder member, a receptacle for fan fold forms pivotally secured at one side on the binder member, a flat writing plate hinged at one end on the receptacle and formed with an opening adjacent the hinged end through which the sheets of the fan fold forms may be drawn from the receptacle onto the writing plate, means for securing a bound book of record sheets on the binder member adjacent the free side of the receptacle, and studs on the receptacle for removably retaining transfer sheets in place on the writing plate, the construction and arrangement being such that when the receptacle is lifted from the binder member a sheet of the bound book will automatically fall under the receptacle and onto the binder member, as described.

6. In a counter sales book, a shallow boxlike receptacle for receiving a pack of manifold forms and provided with a bottom, side wall members and end wall members, one of said members being channel-shaped for receiving the bound edge of a book of record sheets, a writing plate hinged on another of said members and serving as a cover for said receptacle and formed with a slot adjacent the hinged edge thereof through which sets of manifold forms may be drawn from said receptacle onto said writing plate.

7. In combination, in a counter sales book having a binding or cover member, a receptacle having upper and lower end wall members secured on said cover member for receiving a pack of manifold forms, a writing plate over the receptacle and movably secured on the upper end wall member of said receptacle, and means for removably securing a bound book of record sheets in the lower end wall member of said receptacle.

8. In combination, in a counter sales book, a cover member, a receptacle hinged on said cover member for receiving a pack of fan-fold manifold strips, a flat writing plate hinged on said receptacle and formed with a slot for drawing said manifold strips from said receptacle onto said plate, means on said plate for retaining transfer strips thereon and between said manifold strips, means for removably securing a bound book of record sheets on said cover member adjacent said receptacle and opposite the hinged side of said receptacle, whereby, with a sheet of said record book located on said writing plate, a movement of said receptacle about its hinged side and away from said cover member will withdraw said sheet from said writing plate and cause the same to fall onto the said cover member beneath said receptacle, as described.

EDWARD HANO.